United States Patent
Li et al.

(10) Patent No.: US 8,537,281 B2
(45) Date of Patent: Sep. 17, 2013

(54) SIGNAL PROCESSING METHOD BY ADDING ODD AND EVEN FIELD SYNC DATA FOR NEUTRALIZED EFFECTS AND APPARATUS THEREFOR

(75) Inventors: Yi-Lin Li, Kao-Hsiung (TW); Cheng-Yi Huang, I-Lan Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 782 days.

(21) Appl. No.: 12/606,181

(22) Filed: Oct. 26, 2009

(65) Prior Publication Data
US 2010/0110290 A1    May 6, 2010

(30) Foreign Application Priority Data
Nov. 3, 2008 (TW) .............................. 97142346 A

(51) Int. Cl.
*H04N 5/06* (2006.01)
(52) U.S. Cl.
USPC ........ 348/521; 348/500; 348/513; 348/425.4; 348/495; 375/240.28

(58) Field of Classification Search
USPC ........... 348/521, 525, 526, 495, 423.1, 425.4, 348/21, 513; 375/240.28
See application file for complete search history.

(56) References Cited

U.S. PATENT DOCUMENTS
5,619,269 A * 4/1997 Lee et al. ................. 375/240.01

* cited by examiner

*Primary Examiner* — Jeffrey Harold
*Assistant Examiner* — Jean W Desir
(74) *Attorney, Agent, or Firm* — McClure, Qualey & Rodack, LLP

(57) ABSTRACT

A signal processing method by adding odd and even field SYNC data for neutralized effects including the steps of receiving an odd field SYNC data of an odd field, which is different at a certain data segment when compared with an even field SYNC data of an even field, and the even field SYNC data of the even field; adding the odd field SYNC data and the even field SYNC data to neutralize the odd and even field SYNC data so as to generate a combined odd and even field SYNC data; and performing a predetermined signal processing on an input signal according to the combined odd and even field SYNC data.

19 Claims, 6 Drawing Sheets

(1A)

(1B)

SIGNAL PROCESSING METHOD BY ADDING ODD AND EVEN FIELD SYNC DATA FOR NEUTRALIZED EFFECTS AND APPARATUS THEREFOR

BACKGROUND OF THE INVENTION

1. Field of the Invention

The present invention relates to a signal processing method and a related signal processing apparatus, and more particularly, to a signal processing method and a related apparatus for utilizing a combined odd and even field SYNC data to train coefficients of an equalizer or to estimate a channel.

2. Description of the Prior Art

With the coming of the digital era, television broadcasting has gradually transformed from conventional analog systems into digital systems. Present digital television broadcasting formats include the Advanced Television Systems Committee (ATSC) format in the United States, the Digital Video Broadcasting-Terrestrial (DVB-T) format in Europe, and the Integrated Services Digital Broadcasting-Terrestrial (ISDB-T) format in Japan.

As the signals received by the broadcasting signal receiver may be disturbed during transmission, it may not accurately represent the originally transmitted signals. The modulation subsystem of the existing digital television broadcasting system in the United States offers two modes being based on vestigial sideband (VBS) modulation: an 8-VSB mode for terrestrial broadcast, and a 16-VSB mode for high data rates such as cable applications. In terrestrial broadcasting signals (also known as ATSC signals or 8-VSB signals), the transmitter will regularly send out known field SYNC data, which consists of a training sequence used for training coefficients of an equalizer.

It is a common practice in the prior art to train the coefficients of the equalizer whenever each field SYNC data arrives. Or a single field SYNC data is repeated for several times, and then the repeated field SYNC data is used for training the coefficients of the equalizer in order to achieve a goal of fast convergence. However, the terrestrial broadcasting signals transmit the odd field SYNC data or the even field SYNC data alternately, wherein the difference between them is that a certain pseudo-random sequence is inverted. For this reason, whether this certain pseudo-random sequence among each field SYNC data is inverted must be determined first, and then the follow-up action of training the coefficients of the equalizer can be performed. Furthermore, the remaining data other than the field SYNC data among the terrestrial broadcasting signals often interferes with the result of training the coefficients of the equalizer.

SUMMARY OF THE INVENTION

It is one of the objectives of the claimed invention to provide a signal processing method for processing signals by adding odd and even field SYNC data and a related method to solve the abovementioned problems.

According to an exemplary embodiment of the present invention, a signal processing method is provided. The method includes the steps of receiving an odd field SYNC data of an odd field and an even field SYNC data of an even field, wherein the odd field SYNC data is different at a certain data segment when compared with the even field SYNC data; adding the odd field SYNC data and the even field SYNC data to neutralize the odd and even field SYNC data so as to generate a combined odd and even field SYNC data; and performing a predetermined signal processing on an input signal according to the combined odd and even field SYNC data. For example, training coefficients of an equalizer according to the combined odd and even field SYNC data or estimating a channel according to the combined odd and even field SYNC data.

According to another exemplary embodiment of the present invention, a signal processing apparatus is provided. The signal processing apparatus includes a receiving device, a neutralizing unit, and a predetermined signal processing unit. The receiving device receives an odd field SYNC data of an odd field and an even field SYNC data of an even field, wherein the odd field SYNC data is different at a certain data segment when compared with the even field SYNC data. The neutralizing unit is coupled to the receiving device for adding the odd field SYNC data and the even field SYNC data to neutralize the odd and even field SYNC data so as to generate a combined odd and even field SYNC data. The predetermined signal processing unit is coupled to the neutralizing unit for performing a predetermined signal processing on an input signal according to the combined odd and even field SYNC data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
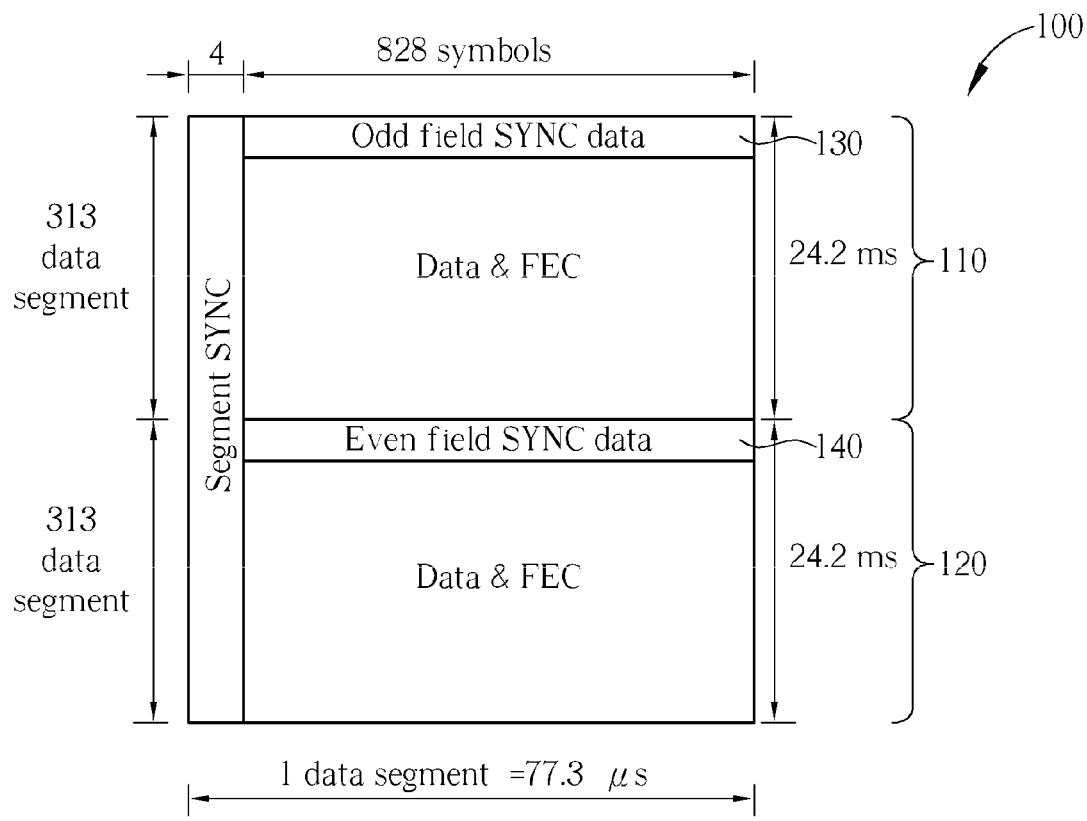
FIG. 1 (including 1A and 1B) is a diagram showing a data structure of a digital television terrestrial broadcasting signal.
Figure 1:
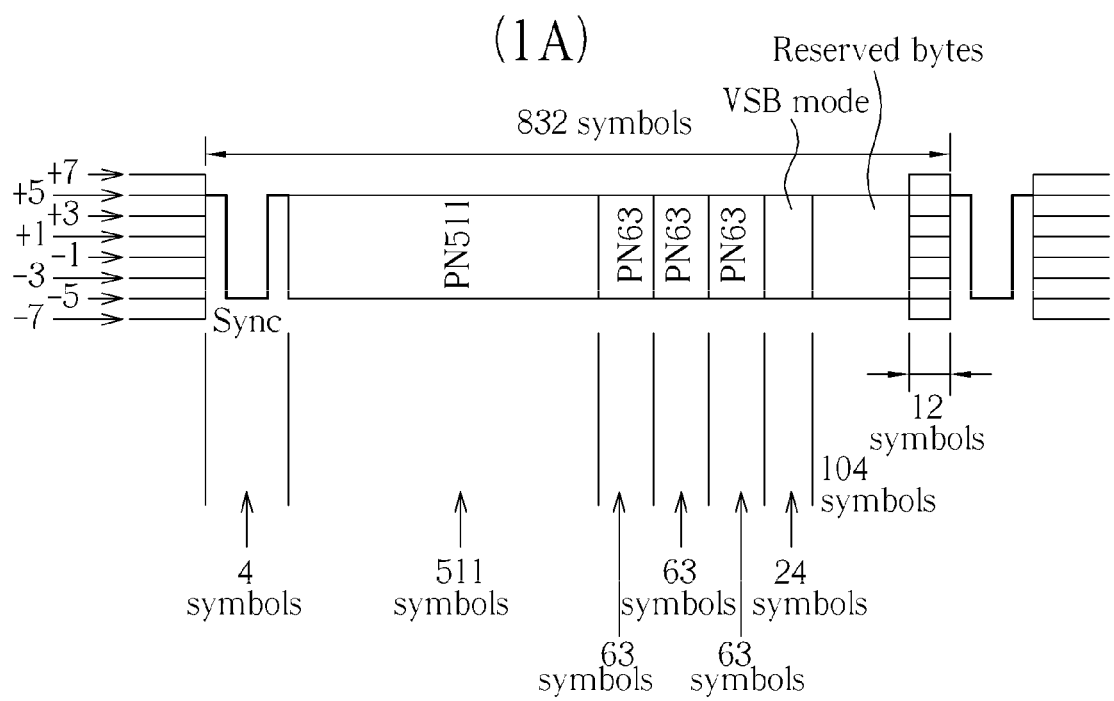

Please refer to FIG. 1. FIG. 1 (including 1A and 1B) is a diagram showing a data structure of a digital television terrestrial broadcasting signal. As shown in 1A, the digital television terrestrial broadcasting signal includes at least one frame 100 consisting of an odd field 110 and an even field 120, wherein each of the odd field 110 and the even field 120 contains 313 data segments. The first data segment among the odd field 110 or the even field 120 is a unique synchronizing signal (i.e., a field SYNC data), wherein the odd field SYNC data 130 among the odd field 110 is different (i.e., having inverted information) at a certain data segment when compared with the even field SYNC data 140 of the even field 120. The remaining 312 data segments are used for attaching data and related forward error correction codes (FEC). 1B represents an odd field SYNC data or an even field SYNC data, wherein each symbol represents one bit of data. A field SYNC data consists of a total of 832 symbols, wherein the abovementioned certain data segment is called a pseudo-random sequence PN63 (including 63 symbols) and this pseudo-random sequence PN63 is repeated three times. The difference between the odd field SYNC data 130 of the odd field 110 and the even field SYNC data 140 of the even field 120 is that their second pseudo-random sequences PN63 are inverted.

Figure 2:
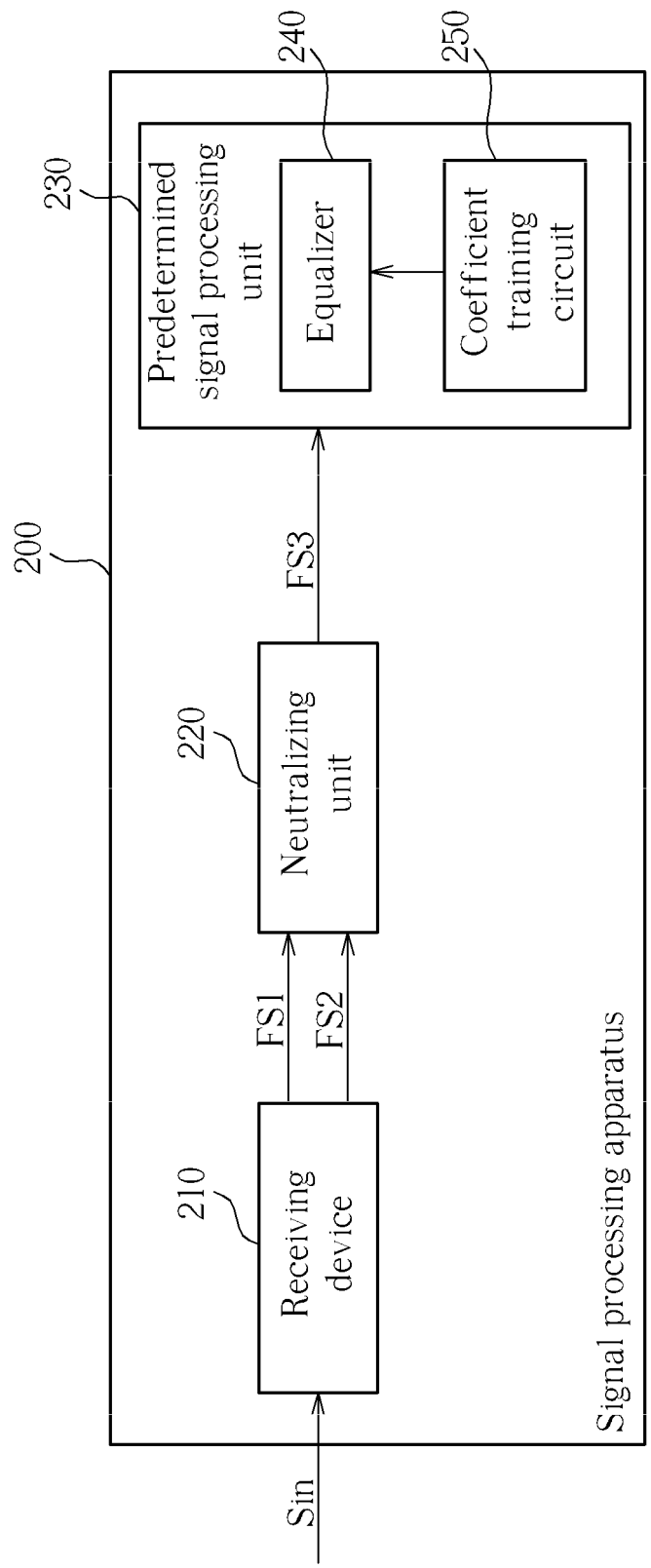
FIG. 2 is a diagram of a signal processing apparatus by using a combined odd and even field SYNC data according to a first embodiment of the present invention.

Please refer to FIG. 2. FIG. 2 is a diagram of a signal processing apparatus 200 by using a combined odd and even field SYNC data according to a first embodiment of the present invention. The signal processing apparatus 200 includes, but is not limited to, a receiving device 210, a neutralizing unit 220, and a predetermined signal processing unit 230. The receiving device 210 receives an input signal Sin having at least one frame (such as the frame 100 shown in 1A), wherein the odd field SYNC data FS1 is different from the even field SYNC data FS2 of the frame. The neutralizing unit 220 is coupled to the receiving device 210 for adding the odd field SYNC data FS1 and the even field SYNC data FS2 to neutralize them so as to generate a combined odd and even field SYNC data FS3 with a neutralized effect. The predetermined signal processing unit 230 is coupled to the neutralizing unit 220 for performing a predetermined signal processing on the input signal Sin according to the combined odd and even field SYNC data FS3. As can be known from FIG. 1, the difference between the odd field SYNC data FS1 and the even field SYNC data FS2 is that their second pseudo-random sequences PN63 are inverted. Hence, the second pseudo-random sequences PN63 of the combined odd and even field SYNC data FS3 will be neutralized to avoid the problem of determining whether the second pseudo-random sequences PN63 is inverted in advance. In addition, the effects caused by the remaining data other than the field SYNC data FS1 and FS2 among the input signal Sin will also be neutralized, and thereby interference to the predetermined signal processing performed by the predetermined signal processing unit 230 can be reduced.

In this embodiment, the predetermined signal processing unit 230 includes an equalizer 240 and a coefficient training circuit 250. The coefficient training circuit 250 is coupled to the equalizer 240 for training coefficients of the equalizer 240 according to the combined odd and even field SYNC data FS3, wherein this action is namely the aforementioned predetermined signal processing to be carried out by the predetermined signal processing unit 230.

Please note that the input signal Sin can comply with an advanced television system committee (ATSC) standard, but this should not be a limitation of the present invention and it can also comply with other digital broadcasting formats. In addition, the coefficient training circuit 250 can train the coefficients of the equalizer 240 according to an adaptive algorithm and the combined odd and even field SYNC data FS3, but this is not meant to be a limitation of the present invention. As operations how the coefficient training circuit 250 trains the coefficients of the equalizer 240 are well known to those skilled in the art, further description is omitted here for brevity.

In one embodiment, the equalizer 240 can be a linear feed-forward equalizer (LE) or a decision feedback equalizer (DFE), but this should not be considered to be limitations of the present invention.

Figure 3:
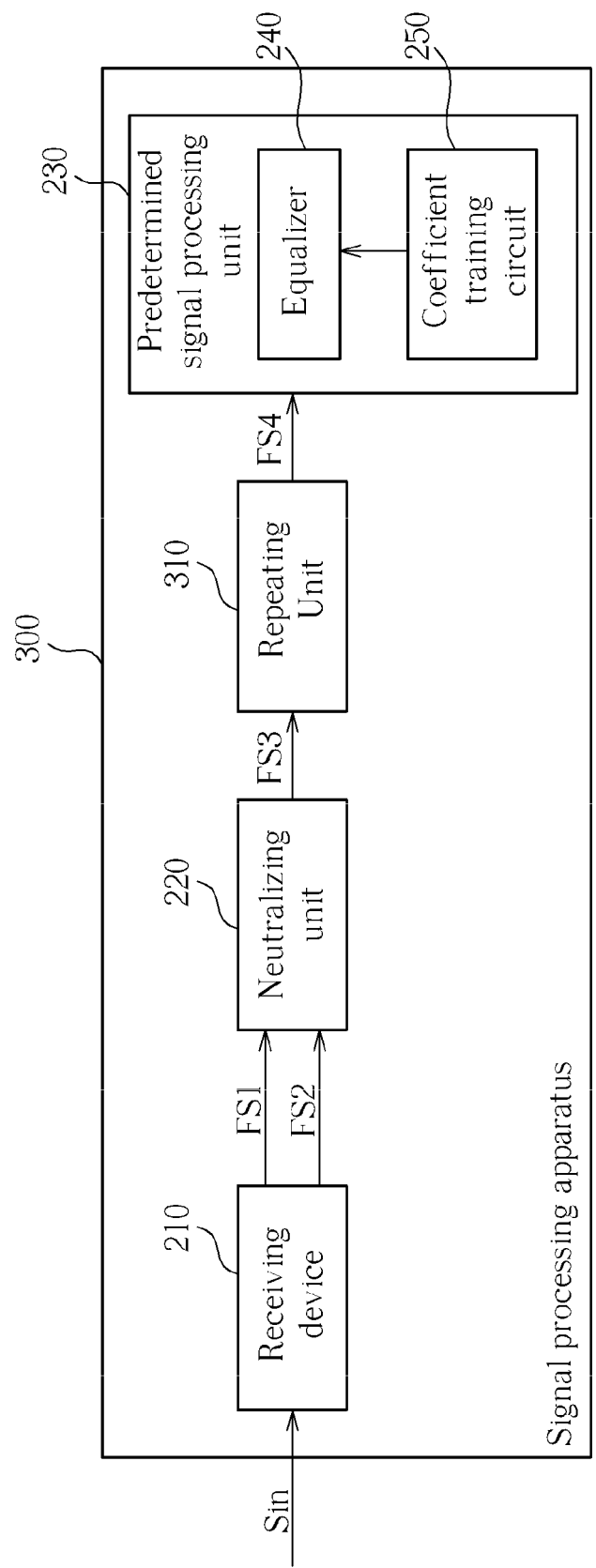
FIG. 3 is a diagram of a signal processing apparatus by using a combined odd and even field SYNC data according to a second embodiment of the present invention.

Please note that, in the abovementioned embodiments, the combined odd and even field SYNC data FS3 is directly used for training the coefficients of the equalizer 240, but the present invention is not limited to this only. In other embodiments, a data recycling technology can be adopted to speed up the convergence of the equalizer coefficients. Please refer to FIG. 3. FIG. 3 is a diagram of a signal processing apparatus 300 by using a combined odd and even field SYNC data according to a second embodiment of the present invention. The signal processing apparatus 300 shown in FIG. 3 is similar to the signal processing apparatus 200 shown in FIG. 2, and the difference between them is that the signal processing apparatus 300 further includes a repeating unit 310 coupled between the neutralizing unit 220 and the predetermined signal processing unit 230 for repeating the combined odd and even field SYNC data FS3 to generate an extended combined odd and even field SYNC data FS4. The coefficient training circuit 250 trains the coefficients of the equalizer 240 according to the extended combined odd and even field SYNC data FS4. Therefore, not only the problem of determining whether the second pseudo-random sequence PN63 is inverted can be avoid and the interference to the result of training the coefficients of the equalizer 240 can be reduced, but also the convergence of the coefficients of the equalizer 240 can be speed up.

Figure 4:
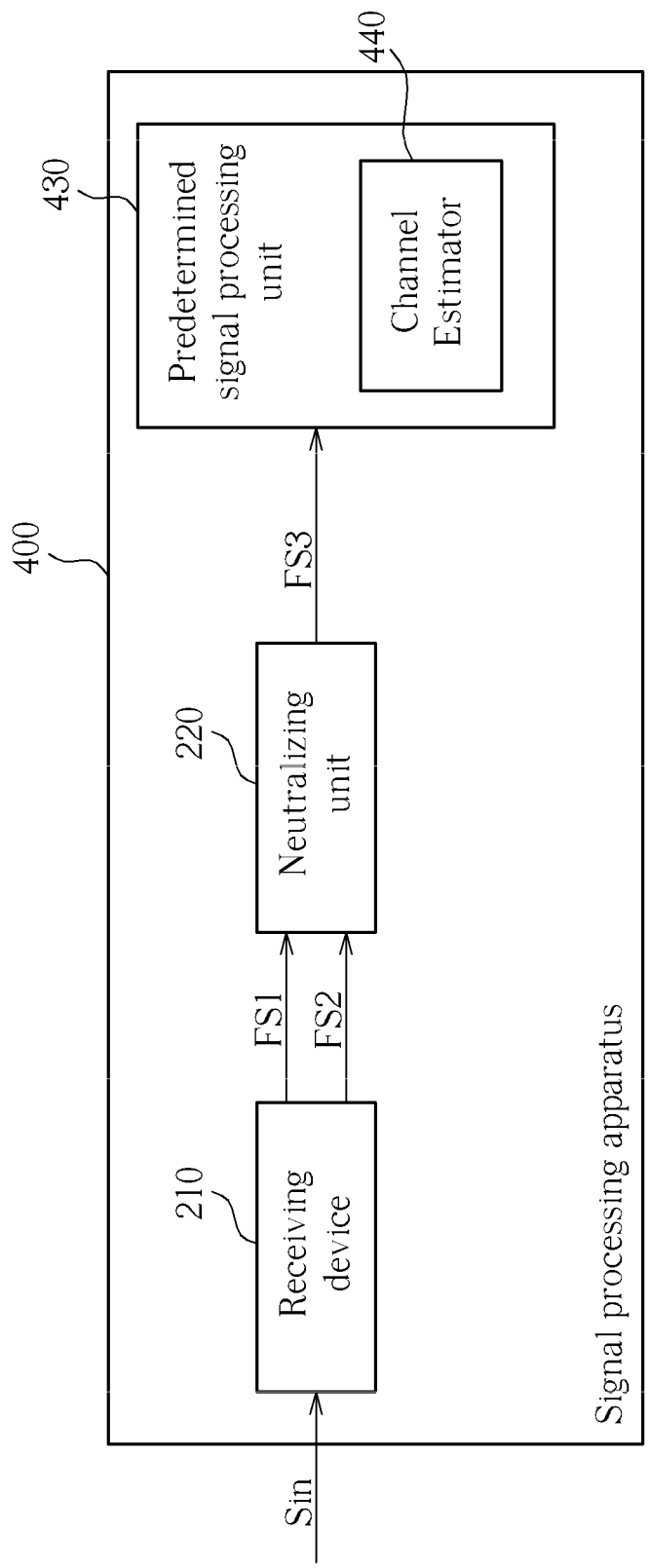
FIG. 4 is a diagram of a signal processing apparatus by using a combined odd and even field SYNC data according to a third embodiment of the present invention.

Please also note that the abovementioned embodiments are presented merely for describing the present invention, and in no way should be considered to be limitations of the scope of the present invention. It will be obvious to those skilled in the art that various modifications of the applications of the predetermined signal processing unit 230 may be made without departing from the spirit of the present invention. Please refer to FIG. 4. FIG. 4 is a diagram of a signal processing apparatus 400 by using a combined odd and even field SYNC data according to a third embodiment of the present invention. The signal processing apparatus 400 shown in FIG. 4 is similar to the signal processing apparatus 200 shown in FIG. 2, the difference between them being that the predetermined signal processing unit 430 of the signal processing apparatus 400 includes a channel estimator 440 for estimating a channel according to the combined odd and even field SYNC data FS3. This action is the aforementioned predetermined signal processing to be carried out by the predetermined signal processing unit 430.

Figure 5:
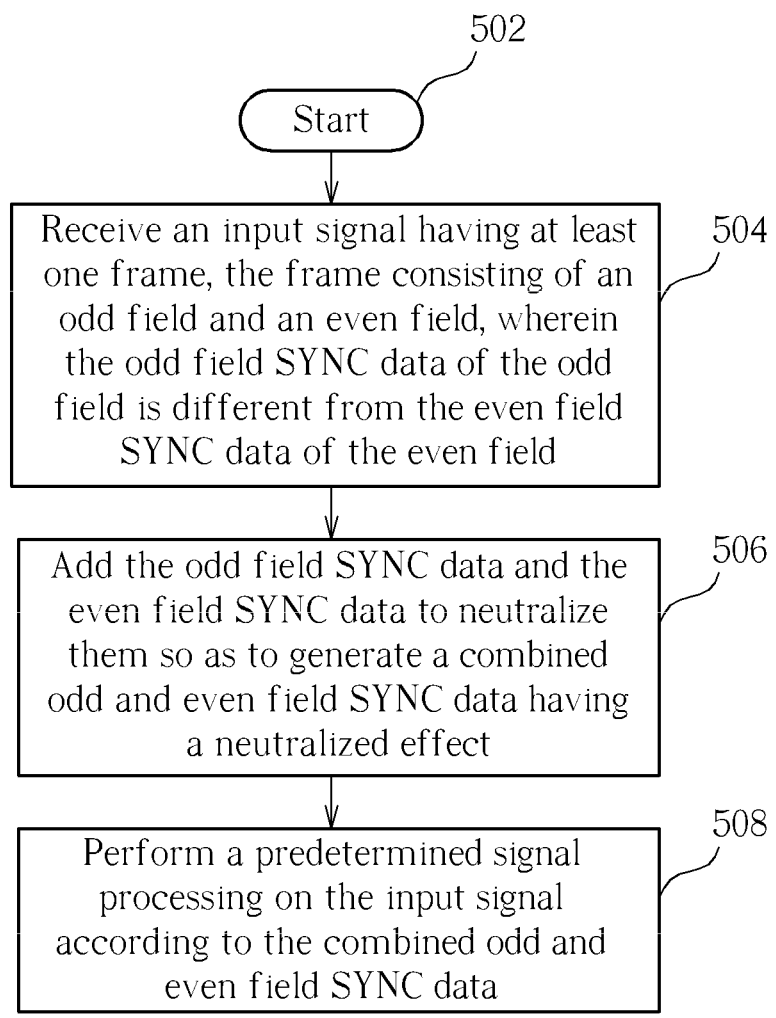
FIG. 5 is a flowchart illustrating a signal processing method by using a combined odd and even field SYNC data according to an exemplary embodiment of the present invention.

Please refer to FIG. 5. FIG. 5 is a flowchart illustrating a signal processing method by using a combined odd and even field SYNC data according to an exemplary embodiment of the present invention. Please note that the following steps are not limited to be performed according to the exact sequence shown in FIG. 5 if a roughly identical result can be obtained. The method includes, but is not limited to, the following steps:

Step 502: Start.

Step 504: Receive an input signal having at least one frame, the frame consisting of an odd field and an even field, wherein the odd field SYNC data of the odd field is different from the even field SYNC data of the even field.

Step 506: Add the odd field SYNC data and the even field SYNC data to neutralize them so as to generate a combined odd and even field SYNC data having a neutralized effect.

Step 508: Perform a predetermined signal processing on the input signal according to the combined odd and even field SYNC data.

Figure 6:
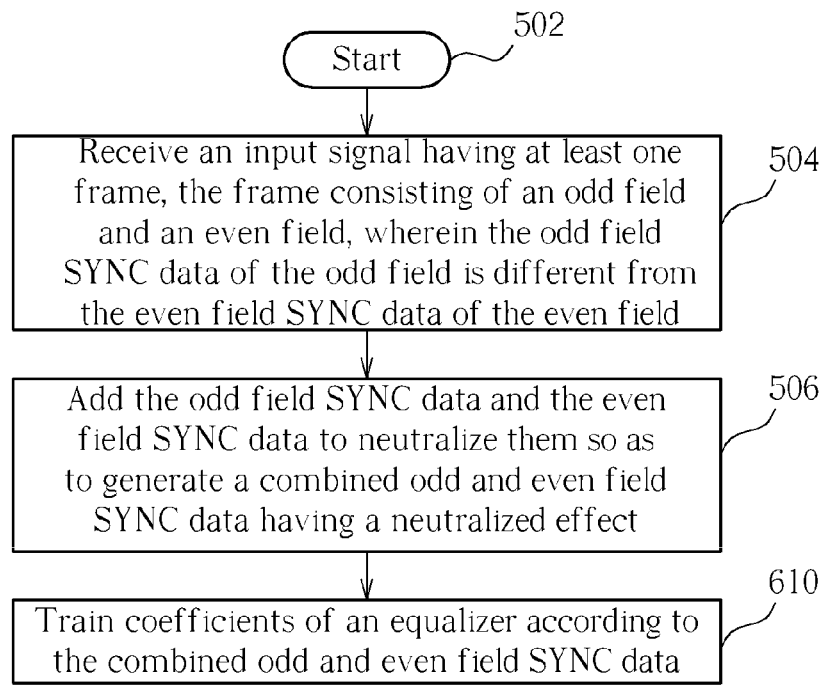
FIG. 6 (including 6A and 6B) is a flowchart illustrating a signal processing method by using a combined odd and even field SYNC data according to another exemplary embodiment of the present invention.
Figure 6:
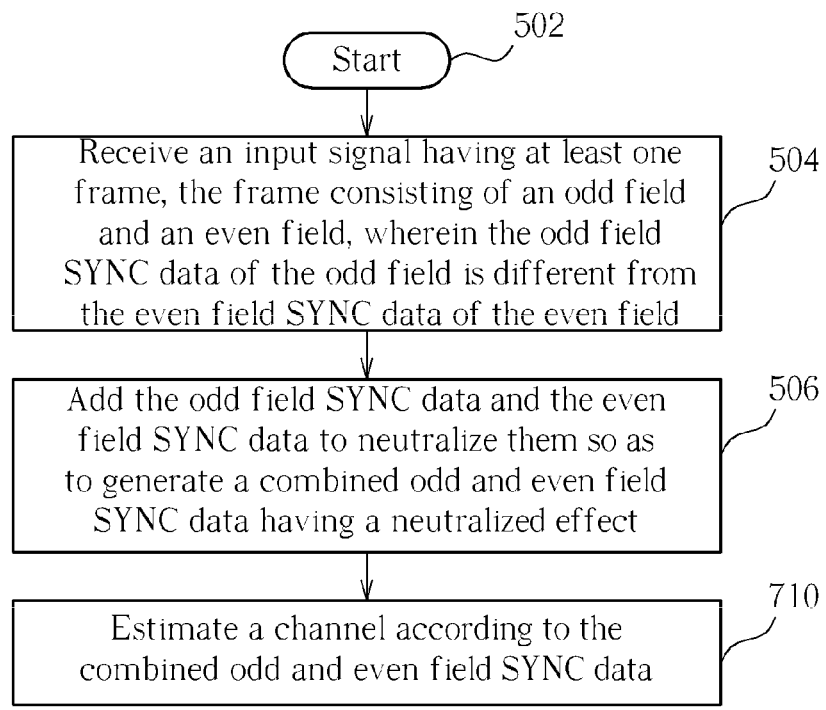

Please refer to FIG. 6 (including 6A and 6B). FIG. 6 is a flowchart illustrating a signal processing method by using a combined odd and even field SYNC data according to another exemplary embodiment of the present invention. As shown in 6A, the method includes, but is not limited to, the following steps:

Step 502: Start.

Step 504: Receive an input signal having at least one frame, the frame consisting of an odd field and an even field, wherein the odd field SYNC data of the odd field is different from the even field SYNC data of the even field.

Step 506: Add the odd field SYNC data and the even field SYNC data to neutralize them so as to generate a combined odd and even field SYNC data having a neutralized effect.

Step 610: Train coefficients of an equalizer according to the combined odd and even field SYNC data.

The steps in 6A are similar to that in FIG. 5, which is an exemplary embodiment of the method shown in FIG. 5. In this embodiment, the predetermined signal processing executed in 6A is represented by training the coefficients of the equalizer according to the combined odd and even field SYNC data (i.e., Step 610). The operations of each element can be known by collocating the steps shown in 6A and the elements shown in FIG. 2. Further description of the operations of each step shown in 6A is therefore omitted here for brevity.

As shown in 6B, the method includes, but is not limited to, the following steps:

Step 502: Start.

Step 504: Receive an input signal having at least one frame, the frame consisting of an odd field and an even field, wherein the odd field SYNC data of the odd field is different from the even field SYNC data of the even field.

Step 506: Add the odd field SYNC data and the even field SYNC data to neutralize them so as to generate a combined odd and even field SYNC data having a neutralized effect.

Step 710: Estimate a channel according to the combined odd and even field SYNC data.

The steps in 6B are similar to that in FIG. 5, which is another exemplary embodiment of the method shown in FIG. 5. In this embodiment, the predetermined signal processing executed in 6B is represented by estimating a channel according to the combined odd and even field SYNC data (i.e., Step 710). The operations of each element can be known by collocating the steps shown in 6B and the elements shown in FIG. 4. Further description of the operations of each step shown in 6B is therefore omitted here for brevity.

Please note that the steps of the abovementioned flowcharts are merely exemplary embodiments of the present invention, and in no way should be considered to be limitations of the scope of the present invention. These methods can include other intermediate steps or can merge several steps into a single step without departing from the spirit of the present invention.

The abovementioned embodiments are presented merely for describing the present invention, and in no way should be considered to be limitations of the scope of the present invention. In summary, the present invention provides a signal processing method for performing a predetermined signal processing by using a combined odd and even field SYNC data and a related apparatus. After adding the odd field SYNC data and the even field SYNC data to generate the combined odd and even field SYNC data, the follow-up predetermined signal processing, such as training on the coefficients of the equalizer or channel estimation, can be performed by using the combined odd and even field SYNC data with the neutralized effect. Therefore, the problem of determining whether the second pseudo-random sequence PN63 is inverted can be avoided. Be note that the so-called neutralized effect can be obtained by performing an adding operation, an average operation, or an equalization operation on the odd field SYNC data and the even field SYNC data, and results by other substantial neutralized means should also fall within the scope of the present invention. Furthermore, the mechanism disclosed in the present invention can reduce interference caused by the remaining data other than the field SYNC data among the input signal Sin, which facilitates the training on the equalizer coefficients or channel estimation. In addition, the mechanism disclosed in the present invention is a simple and practical way, which can be implemented easily and will not cause the increase in the cost and burden on the system.

Those skilled in the art will readily observe that numerous modifications and alterations of the device and method may be made while retaining the teachings of the invention.

What is claimed is:

1. A signal processing method, applied to an odd field and an even field, comprising:

receiving an odd field SYNC data of the odd field and an even field SYNC data of the even field, wherein the odd field SYNC data is different at a certain data segment when compared with the even field SYNC data;

adding the odd field SYNC data and the even field SYNC data to neutralize the odd and even field SYNC data so as to generate a combined odd and even field SYNC data;

performing a predetermined signal processing on an input signal according to the combined odd and even field SYNC data; and wherein the step of adding the odd field SYNC data and the even field SYNC data to neutralize the odd and even field SYNC data so as to generate the combined odd and even field SYNC data comprises: performing an adding operation, an average operation, or an equalization operation on the odd field SYNC data and the even field SYNC data to generate the combined odd and even field SYNC data.

2. The method of claim 1, wherein the input signal complies with an advanced television system committee (ATSC) standard.

3. The method of claim 1, wherein the step of performing the predetermined signal processing on the input signal according to the combined odd and even field SYNC data comprises:

training coefficients of an equalizer according to a neutralized effect caused by the combined odd and even field SYNC data.

4. The method of claim 3, wherein the step of training the coefficients of the equalizer according to the neutralized effect caused by the combined odd and even field SYNC data comprises:

training the coefficients of the equalizer according to an adaptive algorithm and the combined odd and even field SYNC data.

5. The method of claim 3, wherein the step of training the coefficients of the equalizer according to the neutralized effect caused by the combined odd and even field SYNC data comprises:

repeating the combined odd and even field SYNC data to generate an extended combined odd and even field SYNC data; and training the coefficients of the equalizer according to the extended combined odd and even field SYNC data.

6. The method of claim 3, wherein the equalizer is a linear feed-forward equalizer (LE) or a decision feedback equalizer (DFE).

7. The method of claim 1, wherein the step of performing the predetermined signal processing on the input signal according to the combined odd and even field SYNC data comprises:

estimating a channel according to the combined odd and even field SYNC data.

8. A signal processing apparatus, applied to an odd field and an even field, comprising:

a receiving device, for receiving an odd field SYNC data of the odd field and an even field SYNC data of the even field, wherein the odd field SYNC data is different at a certain data segment when compared with the even field SYNC data;

a neutralizing unit, coupled to the receiving device, for adding the odd field SYNC data and the even field SYNC data to neutralize the odd and even field SYNC data so as to generate a combined odd and even field SYNC data; and a predetermined signal processing unit, coupled to the neutralizing unit, for performing a predetermined signal processing on an input signal according to the combined odd and even field SYNC data.

9. The signal processing apparatus of claim 8, wherein the input signal complies with an advanced television system committee (ATSC) standard.

10. The signal processing apparatus of claim 8, wherein the neutralizing unit performs an adding operation, an average operation, or an equalization operation on the odd field SYNC data and the even field SYNC data to generate the combined odd and even field SYNC data.

11. The signal processing apparatus of claim 8, wherein the predetermined signal processing unit comprises:

an equalizer; and a coefficient training circuit, coupled to the equalizer, for training coefficients of the equalizer according to a neutralized effect caused by the combined odd and even field SYNC data.

12. The signal processing apparatus of claim 11, wherein the coefficient training circuit trains the coefficients of the equalizer according to an adaptive algorithm and the combined odd and even field SYNC data.

13. The signal processing apparatus of claim 11, further comprising:

a repeating unit, coupled between the neutralizing unit and the predetermined signal processing unit, for repeating the combined odd and even field SYNC data to generate an extended combined odd and even field SYNC data;

wherein the coefficient training circuit trains the coefficients of the equalizer according to the extended combined odd and even field SYNC data.

14. The signal processing apparatus of claim 11, wherein the equalizer is a linear feed-forward equalizer (LE) or a decision feedback equalizer (DFE).

15. The signal processing apparatus of claim 8, wherein the predetermined signal processing unit comprises a channel estimator for estimating a channel according to the combined odd and even field SYNC data.

16. A signal processing apparatus, comprising:

a receiving device configured to receive an odd field SYNC data of a odd field and an even field SYNC data of an even field, wherein the odd field SYNC data differs at a certain data segment relative to a corresponding data segment in the even field SYNC data;

a neutralizing unit, coupled to the receiving device, configured to perform an operation on the odd field SYNC data and the even field SYNC data to generate a combined odd and even field SYNC data; and a signal processing unit, coupled to the neutralizing unit, configured to process an input signal according to the combined odd and even field SYNC data generated by the neutralizing unit.

17. The signal processing apparatus of claim 16, wherein the operation performed by the neutralizing unit on the odd field SYNC data and the even field SYNC comprises one of: an adding operation, an average operation, or an equalization operation.

18. The signal processing apparatus of claim 16, wherein the signal processing unit comprises:

an equalizer; and a coefficient training circuit, coupled to the equalizer, configured to train coefficients of the equalizer according to a neutralized effect resulting from the operation performed by the neutralizing unit on the odd and even field SYNC data.

19. The signal processing apparatus of claim 18, wherein the coefficient training circuit is configured to train the coefficients of the equalizer according to an adaptive algorithm and the combined odd and even field SYNC data.

* * * * *